United States Patent
Wrobbel

(10) Patent No.: US 6,554,932 B1
(45) Date of Patent: Apr. 29, 2003

(54) PROCESS FOR PRODUCING A BLOW MOLDING PART WITH A DECORATIVE COATING

(75) Inventor: Werner Wrobbel, Gütersloh (DE)

(73) Assignee: Möller Plast GmbH, Bielefeld (DE)

( * ) Notice: Subject to any disclaimer, the term of this patent is extended or adjusted under 35 U.S.C. 154(b) by 0 days.

(21) Appl. No.: 09/505,376

(22) Filed: Feb. 16, 2000

(30) Foreign Application Priority Data

Feb. 16, 1999 (DE) .......................... 199 06 338

(51) Int. Cl.[7] .......................... B29C 44/02; B29C 49/04
(52) U.S. Cl. .................. 156/78; 156/244.13; 264/51; 264/511; 264/515; 264/516
(58) Field of Search ................ 264/516, 511, 264/51, 515; 156/244.13, 78

(56) References Cited

U.S. PATENT DOCUMENTS

| | | | | |
|---|---|---|---|---|
| 2,959,812 A | * | 11/1960 | Allen | 264/516 |
| 3,479,421 A | * | 11/1969 | Armbruster et al. | 264/516 |
| 4,110,390 A | * | 8/1978 | Olcott et al. | 264/511 |
| 4,289,817 A | * | 9/1981 | Valyi | 428/35 |
| 4,601,926 A | * | 7/1986 | Jabarin et al. | 264/516 |
| 4,605,462 A | * | 8/1986 | Lehner | 264/516 |
| 5,223,315 A | * | 6/1993 | Katsura et al. | 428/36.92 |
| 6,123,893 A | * | 9/2000 | Newby, Sr. | 264/516 |

FOREIGN PATENT DOCUMENTS

| | | | | |
|---|---|---|---|---|
| JP | 55-159937 | * | 12/1980 | 264/516 |
| JP | 60-125632 | * | 7/1985 | 264/516 |
| JP | 61-123514 | * | 6/1986 | 264/516 |
| JP | 1-136718 | * | 5/1989 | 264/516 |
| JP | 3-69335 | * | 3/1991 | 264/516 |

* cited by examiner

*Primary Examiner*—Allan R. Kuhns
(74) *Attorney, Agent, or Firm*—Laurence A. Greenberg; Werner H. Stemer; Gregory L. Mayback

(57) ABSTRACT

A blow molding part with a decorative coating is produced in a three-stage process. The blow molding part is initially produced without a coating in a blow mold tool cavity, and is then molded against the decorative coating material in a second blow-molding operation under low pressure and at a low temperature in a decorative coating cavity. The decorative coating material is heated up if appropriate and is placed in advance against a mold contour. The blow mold tool includes a middle part, which is provided between two movable side parts and can be moved or pivoted out. Mold contours of the middle part form with the mold contours of the side parts the blow mold tool cavity and the decorative coating cavity. The blow mold tool cavity has holding devices for the blow molding part. The decorative coating cavity has suction openings and heating elements for molding the decorative coating material and heating it up.

14 Claims, 1 Drawing Sheet

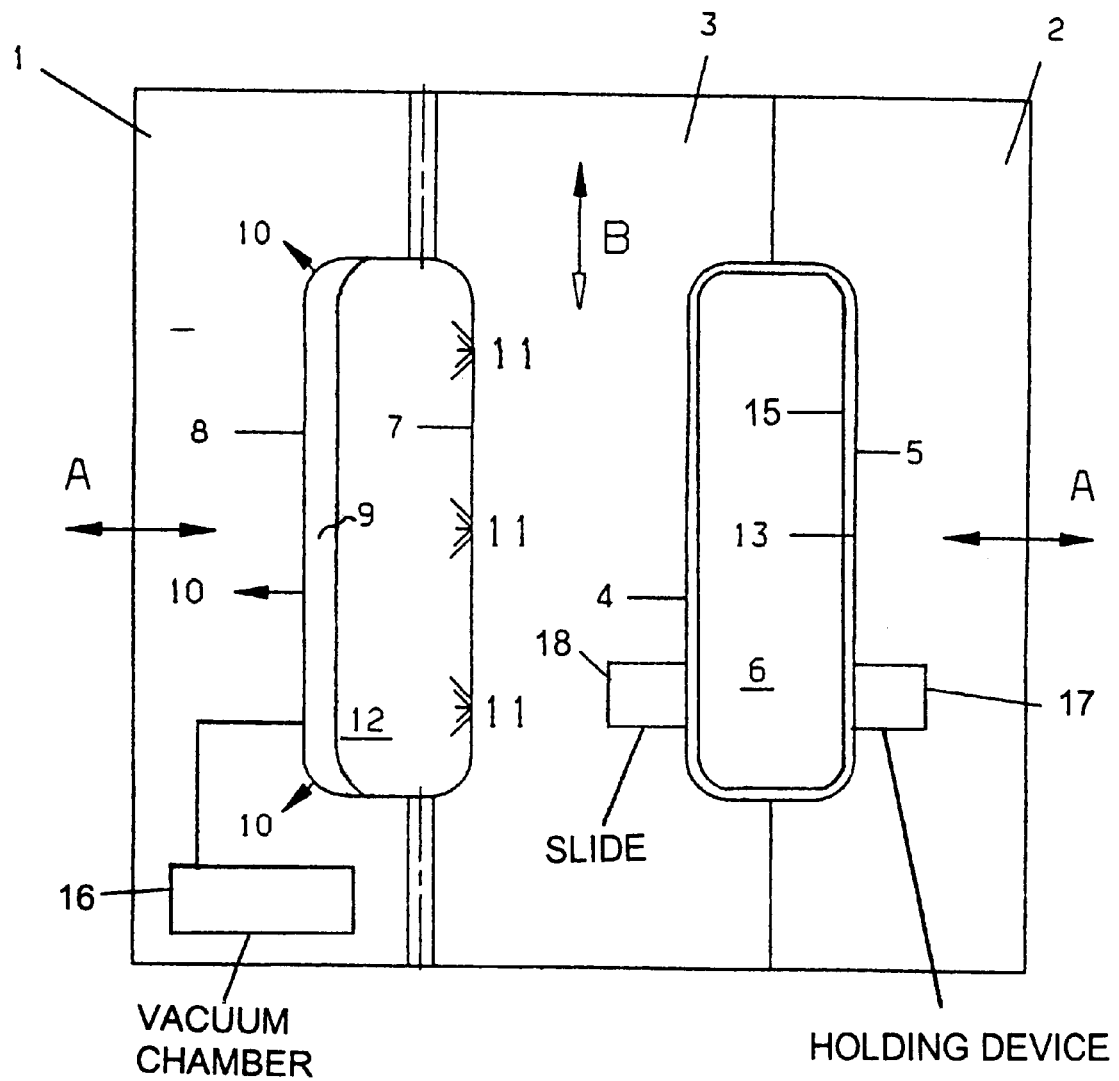

PROCESS FOR PRODUCING A BLOW MOLDING PART WITH A DECORATIVE COATING

BACKGROUND OF THE INVENTION

Field of the Invention

The invention concerns a process for producing blow molding parts having a decorative coating provided in a visible region of the blow molding parts. The decorative coating material is placed into the cavity of a blow mold tool, which is formed by two mold halves. The decorative coating material is then molded onto the blow molding part under pressure and is bonded to its surface during the blow molding. The invention also concerns a blow mold tool for carrying out the process.

In known blow molding processes, a decorative coating of textile material, leather, film or other sheet-like structures and, subsequently, a freshly extruded polymer parison or tube are introduced into the initially opened mold tool. After closing of the blow mold tool and the associated closing of the end openings of the polymer parison, air is blown into the latter. As a result, the walls of the parison, and consequently also the inserted decorative material, are pressed under high pressure and at high temperature against the inner contours of the cavity formed by the two mold tool halves. The high pressure and temperature loading of the decorative material leads not only to changes in color but also to an impairment of the surface structure and, in particular in the case of foam-backed decorative materials, to a compressing of the decorative coating, so that the elastic effect of the foam underlay is lost. If there is a premature contact between the very hot polymer parison and the decorative material, a complete, distortion-free coating cannot be ensured.

SUMMARY OF THE INVENTION

It is accordingly an object of the invention to provide a process for producing blow molding parts provided with a decorative coating that overcomes the above-mentioned disadvantages of the heretofore-known processes of this general type and which meets high quality requirements with regard to the optical and haptic formation of the blow molding parts in the region of the decorative coating. A further object of the invention is to provide a blow mold tool suitable for carrying out the process according to the invention.

With the foregoing and other objects in view there is provided, in accordance with the invention, a process for producing a blow molding part with a decorative coating in a visible region of the blow molding part, the method includes the steps of initially, as part of a multi-stage process, forming a blow molding part in an uncoated state in a blow mold tool cavity under pressure; one of placing and molding a decorative coating material against a mold tool contour in a decorative coating cavity formed substantially identical to the blow mold tool cavity; holding the decorative coating material against the mold tool contour; and subsequently molding and bonding the decorative coating material against an outer contour of the blow molding part in a mold cavity formed by mold contours of the blow mold tool cavity and the decorative coating cavity.

In other words, the object of the invention is achieved with a multi-stage process by initially forming an uncoated blow molding part in a blow mold tool cavity under pressure and placing, molding or shaping the decorative coating material against a mold tool contour in a substantially identically formed decorative coating cavity and subsequently molding it against the outer contour of the blow molding part and bonding it with the latter under reduced blowing pressure in a further mold tool cavity, formed by the mold tool contours of the blow mold tool cavity and the decorative coating cavity.

With the objects of the invention in view there is also provided, a blow mold tool, including a first mold tool contour and a second mold tool contour, the first and second mold tool contours forming a blow mold tool cavity for molding a blow molding part in an uncoated state; and a third mold tool contour and a fourth mold tool contour, the third and fourth mold tool contours forming a decorative coating cavity for molding a decorative coating material of a given thickness against the fourth mold tool contour, the fourth mold tool contour having a molding region for the decorative coating material and being widened in the molding region by the given thickness in comparison with the blow mold tool cavity.

In other words, the blow mold tool according to the invention for carrying out the process is characterized by a blow mold cavity formed by two first mold tool contours for the molding of an uncoated blow molding part and by a decorative coating cavity, formed by two second mold tool contours, for molding or placing the decorative coating material against the mold tool contour, the decorative coating cavity being widened in the molding region of the decorative coating material, by the thickness of the decorative coating material, in comparison with the blow mold cavity.

With the process according to the invention and the correspondingly configured blow mold tool it is possible to produce coated blow molding parts whose decorative coating material is not impaired with regard to color and structure by the high pressures and temperatures prevailing in the customary blow-molding and coating process. In particular, foam-backed decorative layers retain their original elastic and consequently haptically advantageous properties. In addition, the decorative coating material is bonded over its full surface area and without distortion to the blow molding part. Consequently, coated blow molding parts which meet high quality requirements with respect to their haptic and optical formation are provided.

In accordance with another mode of the invention, the close contact with which the decorative coating material is placed against the mold tool contour in the decorative coating cavity is brought about by the effect of a vacuum on the coating material. The decorative coating material therefore adapts itself to the mold tool contour and, moreover, is held against it. Blistering on the finished part is avoided.

In accordance with yet another mode of the invention, the decorative coating material is preferably heated up in advance or inside the decorative coating cavity by heating elements provided in the latter, in order to ensure a high degree of flexibility and consequently close contact with the mold contour.

In accordance with another mode of the invention, the decorative coating material is preformed and introduced into the decorative coating cavity.

In accordance with a further mode of the invention, the bonding of the decorative coating material with the blow molding part may take place directly with the still warm surface of the latter or on a co-extruded layer in the case of a polymer parison produced by co-extrusion and/or with the use of a coupling agent.

In accordance with a further mode of the invention, a surface of the blow molding part suitable for bonding with the decorative coating material is created by another surface layer, formed by co-extrusion of the original parison.

In accordance with yet a further mode of the invention, a foam material suitable for bonding with the decorative coating material is applied in advance to the rear side of the decorative material and this foam layer is used for the bonding of the decorative layer and the substrate part.

In accordance with another mode of the invention, an air gap is left in the decorative coating cavity between the decorative coating material and the blow molding part and a foam material and/or synthetic material is introduced into the air gap for bonding purposes.

In accordance with a further mode of the invention, initially the decorative coating material is produced in the decorative coating cavity by a separate injection-molding and/or foaming operation and is subsequently bonded with the blow molding part.

In accordance with another feature of the invention, the blow mold tool is of a three-part configuration and includes two side parts and a middle part provided between the latter, these parts are respectively movable or pivotable. The blow mold tool cavity is formed between the middle part and one side part by corresponding mold tool contours. The decorative coating cavity is produced in a similar way between the other side part and the other side of the middle part. The suction action on the decorative coating material originates from a vacuum chamber accommodated in the relevant side part.

In accordance with another feature of the invention, the middle part can be moved or pivoted in a direction perpendicular to the direction of movement of the side parts.

In accordance with yet another feature of the invention, the decorative coating cavity is integrated in a vacuum chamber.

In accordance with a further feature of the invention, suction openings connected to the vacuum chamber are provided in the side part receiving the decorative coating material, in the region of the mold tool contour, in order to extract all the air from the space and to avoid the formation of air bubbles on the finished part.

In accordance with another feature of the invention, heating elements for heating up the decorative coating material are provided in the decorative coating cavity.

In accordance with yet another feature of the invention, the first mold tool contour has in the blow mold tool cavity holding devices for holding the blow molding part after its release from the mold contour of the middle part.

In accordance with another feature of the invention, the holding devices for holding the blow molding part are formed by undercuts or retaining cores.

In accordance with another feature of the invention, at least one slide, directed into the blow mold tool cavity, is provided on the middle part for producing undercuts, the corresponding side part being provided in a pivotable manner and the mold tool regions being correspondingly beveled in the separation or parting.

Other features which are considered as characteristic for the invention are set forth in the appended claims.

Although the invention is illustrated and described herein as embodied in a process for producing blow molding parts with a decorative coating and a corresponding blow mold tool for producing such blow molding parts, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE is a diagrammatic cross-sectional view of a three-part mold tool for producing a blow molding part and for coating it with a decorative material in a partial region.

DESCRIPTION OF THE PREFERRED EMBODIMENTS

Referring now to the single FIGURE in detail, there is shown a mold tool including two side parts 1 and 2, which can be moved in the lateral direction, as well as a middle part 3 provided between the side parts. The middle part 3 can be moved or pivoted perpendicularly to the direction of movement A of the two side parts 1 and 2, that is to say in the direction of the arrow B. The side part 2 and the middle part 3 respectively have a first mold tool contour 4 and 5, which in the moved-together state of these two mold parts form a blow mold tool cavity 6 which corresponds to the outer contour of the blow molding part 15 to be produced, but without a decorative coating.

The middle part 3 is provided on the opposite side with a second mold tool contour 7, which coincides or matches with the mold contour 5 of the side part 2, while a second mold tool contour 8, formed in the side part 1, opposite the first mold contour 4 of the middle part 3, is widened by the layer thickness of the decorative coating material 9 to be applied to the blow molding part.

Indicated by the arrows 10 on the mold contour 8 are suction openings 10, which are connected to a vacuum chamber 16 in the side part 1 and to a vacuum generator for applying a suction action to the decorative coating material 9 from the mold tool contour 8. Provided on the second mold contour 7 of the middle part 3 are heating elements 11, which serve for heating up the decorative coating material 9.

A blow molding part 15 to be provided with a temperature- and/or pressure-sensitive decorative coating is produced by introducing a freshly extruded polymer parison or tube or a parison produced by co-extrusion into the blow mold tool cavity 6, to be precise in the moved-apart state of the side part 2 and the middle part 3. Moving together of the two mold tool halves 2 and 3 has the effect of closing the blow mold tool cavity 6 and consequently the two end faces of the polymer parison. Air is subsequently blown into the blow mold tool cavity 6, so that the wall of the polymer parison comes to bear under high pressure against the mold tool contours 4 and 5.

At the same time as the forming of the blow molding part 15 described above takes place, a sheet-like decorative coating material 9 is placed into the decorative coating cavity 12, with the side part 1 moved out, and is heated up with the aid of the heating elements 11. The decorative coating material 9 may, however, be introduced into the decorative coating cavity 12 in an already preheated state. Following a sealed closing of the decorative coating cavity 12, a vacuum is applied to the decorative coating material 9 via the suction openings 10, so that the flexible decorative coating material 9 comes to bear closely against the mold contour 8 of the side part 1 and is held in this position. The inclusion of air between the mold tool contour 8 and the decorative coating material 9 is prevented. The formation of air bubbles on the finished part is prevented by having all the air extracted from the space between the mold tool contour 8 and the decorative coating material 9.

Once the blow molding part 15 and the decorative coating material 9 have been formed and a basic stability has been achieved, the side parts 1 and 2 are moved apart and the middle part 3 is pivoted out or rotated. As this happens, the decorative coating material 9 and the blow molding part 15 remain in their position on the mold tool contours 8 and 5, respectively. While the blow molding part 15 is fixed by holding devices, schematically indicated by reference numeral 17, the holding devices being for instance undercuts or retaining cores, the decorative coating material is held on account of the action of the vacuum. The two side parts 1 and 2 are then moved together and, after closing of the mold, the still warm blow molding part 15, with slight internal pressure inside it produced by air being supplied, is gently pressed against the decorative coating material 9 and bonded to the latter.

The blow molding part 15 may, however, also be coated beforehand with a coupling agent or a bonding agent in order to ensure the bonding with the decorative coating material. It is also possible to produce the blow molding part from a polymer parison formed by co-extrusion. In this case, the co-extruded layer assumes the function of a coupling agent if the actual material of the blow molding part does not adhere to the decorative coating material, or adheres only inadequately, or does not provide a suitable adherent surface.

On account of the low internal pressure in the decorative coating cavity during the molding of the blow molding part 15 onto the decorative coating, even pressure- and temperature-sensitive coating agents, for example textiles, foam-backed film or real leather, cannot be impaired in their surface structure and color or in the foam structure.

The invention is not restricted to the exemplary embodiment explained above. Rather, modifications are conceivable within the scope of the invention. For example, the mold tool cavities for the decorative coating material and the blow molding part may also be accommodated in molds which are independent of one another. However, the simultaneous molding of the coating material and the blow molding part in the same mold, described above, is advantageous from production-engineering and commercial aspects.

With the combined mold described above, a slide, schematically indicated with reference numeral 18 and directed toward the decorative side, may be provided in the middle part 3 for producing blow molding parts with an undercut, the side part being provided in a pivotable manner. The side part is raised (tilted up) and drawn or pushed forward in the direction of the undercut. Subsequently, the machine is moved together and the side part is synchronously drawn back and lowered. The mold regions are correspondingly beveled in the separation. Demolding or ejection of the undercut regions is made possible by a tilting movement.

The decorative coating material may also be three-dimensionally preformed and adapted to the mold contour, so that it is already in close contact with the mold tool contour and only has to be held by the vacuum.

I claim:

1. A process for producing a blow molding part with a decorative coating, the process which comprises:

forming a blow molding part in an uncoated state in a blow mold tool cavity under pressure;

placing and molding a decorative coating material against a mold tool contour in a separate decorative coating cavity, the decorative coating cavity being substantially identical to the blow mold tool cavity except for having an additional space for the decorative coating material;

holding the decorative coating material against the mold tool contour; and subsequently molding and bonding the decorative coating material against an outer contour of the blow molding part in a mold cavity formed by mold contours of the blow mold tool cavity and the decorative coating cavity.

2. The process according to claim 1, which comprises bringing the decorative coating material into contact with the mold tool contour in the decorative coating cavity by sealing the decorative coating cavity and using a vacuum.

3. The process according to claims 1, which comprises heating the decorative coating material outside the decorative coating cavity.

4. The process according to claim 1, which comprises heating the decorative coating material inside the decorative coating cavity.

5. The process according to claim 1, which comprises:
providing the decorative coating material in a preformed state; and
introducing the decorative coating material into the decorative coating cavity in the preformed state.

6. The process according to claim 1, which comprises establishing a bond between the blow molding part and the decorative coating material by using a coupling agent.

7. The process according to claim 1, which comprises establishing a bond between the blow molding part and the decorative coating material with a hot surface of the blow molding part.

8. The process according to claim 1, which comprises establishing a bond between the blow molding part and the decorative coating material with a coupling agent and with a hot surface of the blow molding part.

9. The process according to claim 1, which comprises creating a surface of the blow molding part by co-extrusion of a parison.

10. The process according to claim 1, which comprises:
applying a foam material suitable for bonding with the decorative coating material to a rear side of the decorative material; and
using the foam material for bonding the decorative layer and the blow molding part.

11. The process according to claim 1, which comprises:
leaving an air gap between the decorative coating material and the blow molding part in the decorative coating cavity; and
introducing at least one material selected from the group consisting of a foam material and a synthetic material into the air gap for bonding purposes.

12. The process according to claim 1, which comprises producing the decorative coating material in the decorative coating cavity with an injection-molding operation prior to bonding the decorative coating material against the outer contour of the blow molding part.

13. The process according to claim 1, which comprises producing the decorative coating material in the decorative coating cavity with a foaming operation prior to bonding the decorative coating material against the outer contour of the blow molding part.

14. The process according to claim 1, which comprises producing the decorative coating material in the decorative coating cavity with an injection-molding operation and a foaming operation prior to bonding the decorative coating material against the outer contour of the blow molding part.

* * * * *